United States Patent [19]
Ensten

[11] Patent Number: 5,861,746
[45] Date of Patent: Jan. 19, 1999

[54] METHOD FOR DETECTING CLOSURE OF A SOLENOID COIL FROM THE RISE TIME OF EACH OF THE CURRENT PEAKS OF THE SOLENOID COIL

[75] Inventor: Barry John Ensten, Dunstable, United Kingdom

[73] Assignee: Motorola Inc., Schaumburg, Ill.

[21] Appl. No.: 738,770

[22] Filed: Oct. 28, 1996

[30] Foreign Application Priority Data

Nov. 3, 1995 [GB] United Kingdom ................... 9522800

[51] Int. Cl.⁶ ............................. G01B 7/14; H01H 47/00
[52] U.S. Cl. ............................. 324/207.16; 324/207.26; 324/654; 361/160
[58] Field of Search ................... 324/207.16, 207.24, 324/226, 207.22, 207.26, 262, 654, 656; 318/687; 361/152, 153, 154, 160, 170, 186, 187

[56] References Cited

U.S. PATENT DOCUMENTS 5,424,637  6/1995  Oudyn et al. ..................... 324/207.16
5,481,187  1/1996  Marcott et al. .................... 324/207.16

*Primary Examiner*—Jay M. Patidar
*Attorney, Agent, or Firm*—Nicholas C. Hopman

[57] ABSTRACT

A method for detecting closure of a solenoid coil in a solenoid arrangement in a solenoid arrangement having first (4) and second (40) solenoid coils and a solenoid armature (5) that communicates between the coils (4, 40). A holding current signal (25) is provided (70) to the first solenoid coil (4) to maintain the solenoid armature (5) in an initial closed position with the first solenoid coil (4). A pulling current signal (27) is provided (50) to the second solenoid coil (40), the pulling current signal includes current peaks (19) with a measurable rise time (21). A value representative of the rise time for one of the current peaks is stored (58, 60), then the holding current signal is removed from the first solenoid coil (4). A rise time of each of the current peaks in the second solenoid coil (40) are sensed, and a determination when the rise time of a current peak changes from the stored rise time by a predetermined amount is made (90). An indication (94) that the solenoid armature is in a closed position with the second solenoid coil is made when the rise time of a current peak returns to substantially the same value as the stored rise time.

16 Claims, 4 Drawing Sheets

5,861,746

METHOD FOR DETECTING CLOSURE OF A SOLENOID COIL FROM THE RISE TIME OF EACH OF THE CURRENT PEAKS OF THE SOLENOID COIL

FIELD OF THE INVENTION

This invention relates to a method for detecting closure of a solenoid coil.

BACKGROUND OF THE INVENTION

Solenoids are frequently used to inject fuel into automotive engines, to control electronic transmissions, and sometimes to actuate brakes. All such solenoids use a solenoid driver that causes current to be injected into the solenoid's coil at preselected times in order to control the position of the solenoid armature and hence the opening and closing of the solenoid coil.

In many applications, it is desirable that the closure of the solenoid coil can be detected accurately. Closure detection allows, for example, verification of the operation of the solenoid, fault diagnosis, and the power dissipation in the load can be reduced by adaptively controlling the coil energise time to the minimum required for the solenoid armature to move. Accurate closure detection has particular further advantages for automotive injector solenoid coils. By detecting the closure of the injector coil, mechanical lags in the injector system can be measured and compensated for thereby improving engine timing.

The benefits from closure detection are well known, however, arrangements for implementing closure detection have so far been significantly expensive.

European patent application no. EP-A-0400389 discloses a solenoid closure detection arrangement that uses the fact that as the solenoid armature moves towards the closed position, the solenoid's inductance increases which increases the decay time of the current in the coil. The arrangement therefore detects closure of the solenoid by detecting the increase in decay time.

It is therefore desirable to provide an improved method for detecting closure of a solenoid coil which is simpler and less expensive to implement.

SUMMARY OF THE INVENTION

In accordance with a first aspect of the present invention there is provided a method for detecting closure of a solenoid coil in a solenoid arrangement comprising first and second solenoid coils and a solenoid armature that moves between the first and second solenoid coils, the method comprising the steps of:

providing a holding current signal to the first solenoid coil to maintain the solenoid armature in an initial closed position with the first solenoid coil;

providing a pulling current signal to the second solenoid coil, the pulling current signal comprising a plurality of current peaks, each of the current peaks having a measurable rise time;

storing a value representative of the rise time for one of the plurality of current peaks;

removing the holding current signal from the first solenoid coil;

sensing the rise time of each of the current peaks in the second solenoid coil and determining when the rise time of a current peak changes from the stored rise time by a predetermined amount which indicates that the solenoid armature has started to move towards the second solenoid coil;

continuing to sense the rise time of each of the current peaks in the second solenoid coil; and providing an indication that the solenoid armature is in a closed position with the second solenoid coil when the rise time of a current peak returns to substantially the same value as the stored rise time.

In accordance with a second aspect of the present invention there is provided a method for detecting closure of a first solenoid coil in a solenoid arrangement comprising first and second solenoid coils and a solenoid armature that moves between the first and second solenoid coils, the solenoid arrangement further comprising a switch coupled in series with the second solenoid coil between a supply voltage terminal and a reference voltage terminal, the method comprising the steps of:

providing a holding current signal to the first solenoid coil to maintain the solenoid armature in an initial closed position with the first solenoid coil;

providing a PWM control signal to the switch to control the opening and closing of the switch such that a pulling current signal, comprising a plurality of current peaks, is established in the second solenoid coil, each of the current peaks having a measurable rise time which is dependent on the width of the corresponding pulse of the PWM control signal;

storing a value representative of the width of a PWM control signal pulse for one of the plurality of current peaks;

removing the holding current signal from the first solenoid coil;

sensing the width of the PWM control signal pulse for each of the current peaks in the second solenoid coil and determining when the sensed width changes from the stored width by a predetermined amount which indicates that the solenoid armature has started to move towards the second solenoid coil;

continuing to sense the width of the PWM control signal pulse for each of the current peaks in the second solenoid coil; and providing an indication that the solenoid armature is in a closed position with the second solenoid coil when the sensed width of a PWM control signal pulse returns to substantially the same value as the stored width.

The method for detecting closure of a first solenoid coil in accordance with the present invention has all the advantages of the known techniques of closure detection outlined above but since it can be simply implemented in, for example, specific logic circuits ASIC (Application Specific Integrated Circuit) or software, the present invention is a low cost solution.

Furthermore, the present invention utilises three measurements of the rise time or width of the PWM control signal pulses for closure detection which eliminates errors due to power supply variations.

BRIEF DESCRIPTION OF THE DRAWINGS

A method for detecting closure of a solenoid coil in accordance with the invention will now be described, by way of example only, with reference to the accompanying diagrams in which.

DETAILED DESCRIPTION OF THE DRAWINGS

Figure 1:
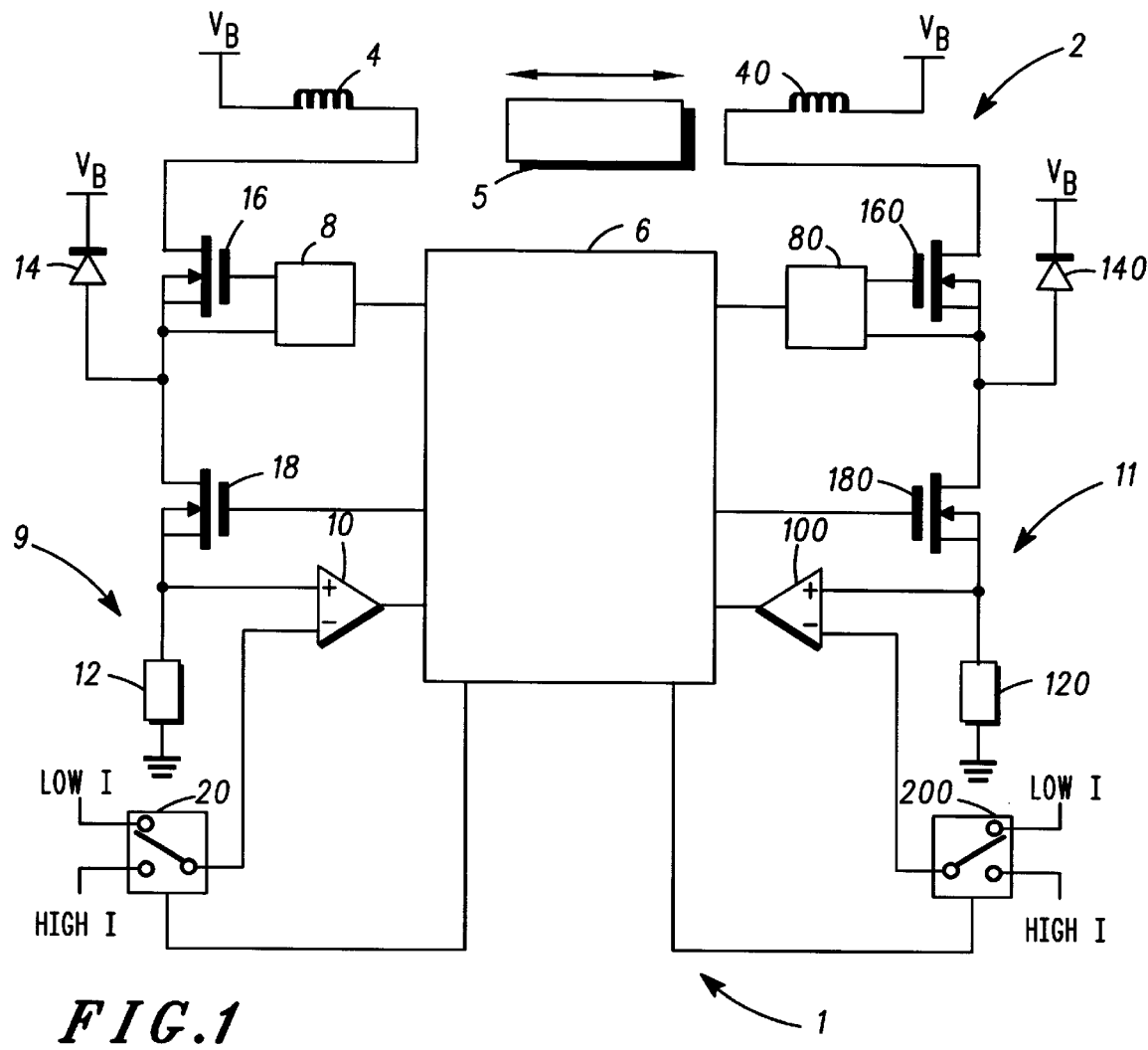
FIG. 1 is a schematic diagram of a solenoid arrangement in accordance with the present invention.

Referring firstly to FIG. 1, a solenoid arrangement 2 comprises first 4 and second 40 solenoid coils, a solenoid armature 5 movable therebetween and a solenoid driver circuit 7 for controlling the opening and closing of the first 4 and second 40 solenoid coils. The solenoid driver circuit 7 also detects closure of the first 4 and second 40 solenoid coils in accordance with a preferred embodiment of the present invention.

Figure 2:
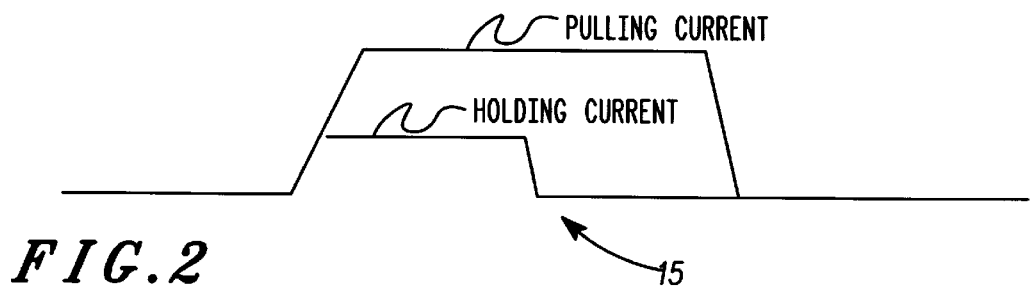
FIG. 2 shows a diagrammatic representation of the current signals which are respectively established in the two solenoid coils of FIG. 1.

The solenoid armature 5 is moved between the first 4 and second 40 solenoid coils by controlling the current in the respective solenoid coils. In order to improve the timing accuracy of such a two-solenoid coil arrangement, one of the solenoid coils carries a holding current signal and the other coil carries a pulling current signal (see FIG. 2). The holding current signal holds the solenoid armature 5 in a closed position with respect to the solenoid coil carrying the holding current signal until the pulling current signal has reached a required value. After a predetermined time, the holding current signal is removed (at 15 on FIG. 2), and the solenoid armature 5 moves towards the other solenoid coil under the force of the pulling current signal. Thus, the holding current signal ensures that the solenoid armature 5 does not move before the pulling current signal has stabilised.

The preferred embodiment uses a constant 'OFF' time Pulse Width Measurement (PWM) technique to control the current in the first 4 and second 40 solenoid coils and to detect the closure of the solenoid coils. That is, the current signals supplied to the first 4 and second 40 solenoid coils each comprises a series of current peaks, each current peak having a measurable rise time and a constant decay time as the current is turned off for a constant predetermined time.

The preferred solenoid driver circuit 7 comprises a processor unit 6, which may be a microprocessor or an ASIC controller, a first driver circuit 9 for driving the first solenoid coil 4 and a second driver circuit 11 for driving the second solenoid coil 40.

The first driver circuit 9 comprises first 16 and second 18 switches and a sensing resistor 12 coupled in series with the first solenoid coil 4. One end of the first solenoid coil 4 is coupled to a battery supply voltage $V_B$ terminal and one end of the sensing resistor 12 is coupled to a reference voltage terminal. A re-circulation diode 14 is coupled across the first solenoid coil 4 and the first switch 16. A level shifter circuit 8 is coupled between the processor unit 6 and the first switch 16. A control input of the second switch 18 is coupled to the processor unit 6 In the preferred embodiment, the first 16 and second 18 switches are MOSFET transistors. One of the current electrodes and the control electrode of the first switch is coupled to first and second outputs of the level shifter circuit 8. The control electrode of the second switch 18 forms the control input of the second switch 18.

A comparator 10 has a first input coupled to receive a first (LowI) or a second (HighI) reference current signal depending on the state of a third switch 20, a second input coupled to receive a signal representative of the current flowing through the sense resistor 12 and an output coupled to the processor unit 6. The state of the third switch 20 is controlled by the processor unit 6. The amplitude of the first reference current signal (LowI) is less than the amplitude of the second reference current signal (HighI).

The second driver circuit 11 drives the second solenoid coil 40 which has one end coupled to the battery supply voltage VB terminal. The second driver circuit 11 is identical to the first driver circuit 9 and like components to those of the first driver circuit 9 are referenced by the same reference numeral multiplied by ten.

The operation of the first driver circuit 9 and first solenoid coil 4 will now be described.

The processor unit 6 provides a control signal, comprising PWM pulses, to the control input of second switch 18 which control signal opens or closes second switch 18 according to whether the signal at the control input is high or low. In the preferred embodiment, second switch 18 comprises a MOSFET transistor and second switch 18 is therefore closed when the control signal on the control input is low (e.g. substantially less than 3 volts) and is open when the control signal on the control input is high (e.g. substantially more than 3 volts).

For the case when the solenoid armature 5 is at rest at the first solenoid coil 4 and a holding current signal is to be established in the first solenoid coil 4, the processor unit 6 controls third switch 20 so that the first reference current signal (LowI) is supplied to the first input of the comparator 10. For the case when the solenoid armature 5 is at rest at the second solenoid coil 40 and a pulling current signal is to be established in the first solenoid coil 4, the processor unit 6 controls third switch 20 so that the second reference current signal (HighI) is supplied to the first input of the comparator 10.

When first switch 16 and second switch 18 is closed, current flows through the coil 4 and the sense resistor 12 and the coil 4 is turned on. The current in the coil 4 is sensed across the sense resistor 12 and compared by comparator 10 to either the first (LowI) or second (HighI) reference current signal depending on the state of the third switch 20. Current flows through the coil 4 until the current in the coil reaches the level of the first (LowI) or second (HighI) reference current signal. When the current in the coil 4 reaches the reference current signal, there is a transition in the output signal at the output of the comparator 10 which is detected by the processor unit 6. In response to detecting a transition, the processor unit 6 generates a PWM control signal to open the second switch 18 and the coil 4 is turned off. The time during which current flows through the second switch 18 is known as the rise time or ON time.

When the second switch 18 is open, the current in the coil 4 flows through the first switch 16 and the re-circulation diode 14 and decays slowly. After a predetermined time, known as the constant decay time or OFF time, the processor unit 6 provides a PWM control signal to close the second switch 18 and the cycle repeats. A counter (not shown) may be used to clock the OFF time.

The first switch 16 is normally closed during the time the second switch 18 is opened and closed in response to the PWM control signals generated by the processor unit 6. However, when the holding current or pulling current is switched off by the processor unit 6 (see FIG. 2), the first switch 16 is opened by the processor unit 6. When this happens, the level shifter circuit 8 drives the first switch 16 into its linear region by applying a voltage signal of approximately 3 volts to the control input. The current in the solenoid coil 4 flows through the first switch 16 and the re-circulation diode 14 and decays very quickly since it sees the first switch 16 as a high impedance.

Figure 3:
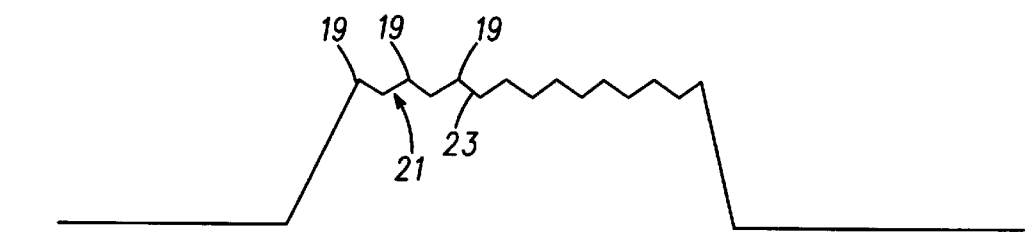
FIG. 3 is a more detailed representation of a current signal which is established in a solenoid coil of FIG. 1.

FIG. 3 shows a representation of the current signal (whether pulling or holding) which is established in the first solenoid coil 4. As can be seen the current signal comprises a plurality of peaks 19, each peak having a rise time 21 and a decay time 23.

The operation of the second driver circuit 11 and second solenoid coil. 40 is identical to the operation of the first driver circuit 9 and first solenoid coil 4.

Figure 4:
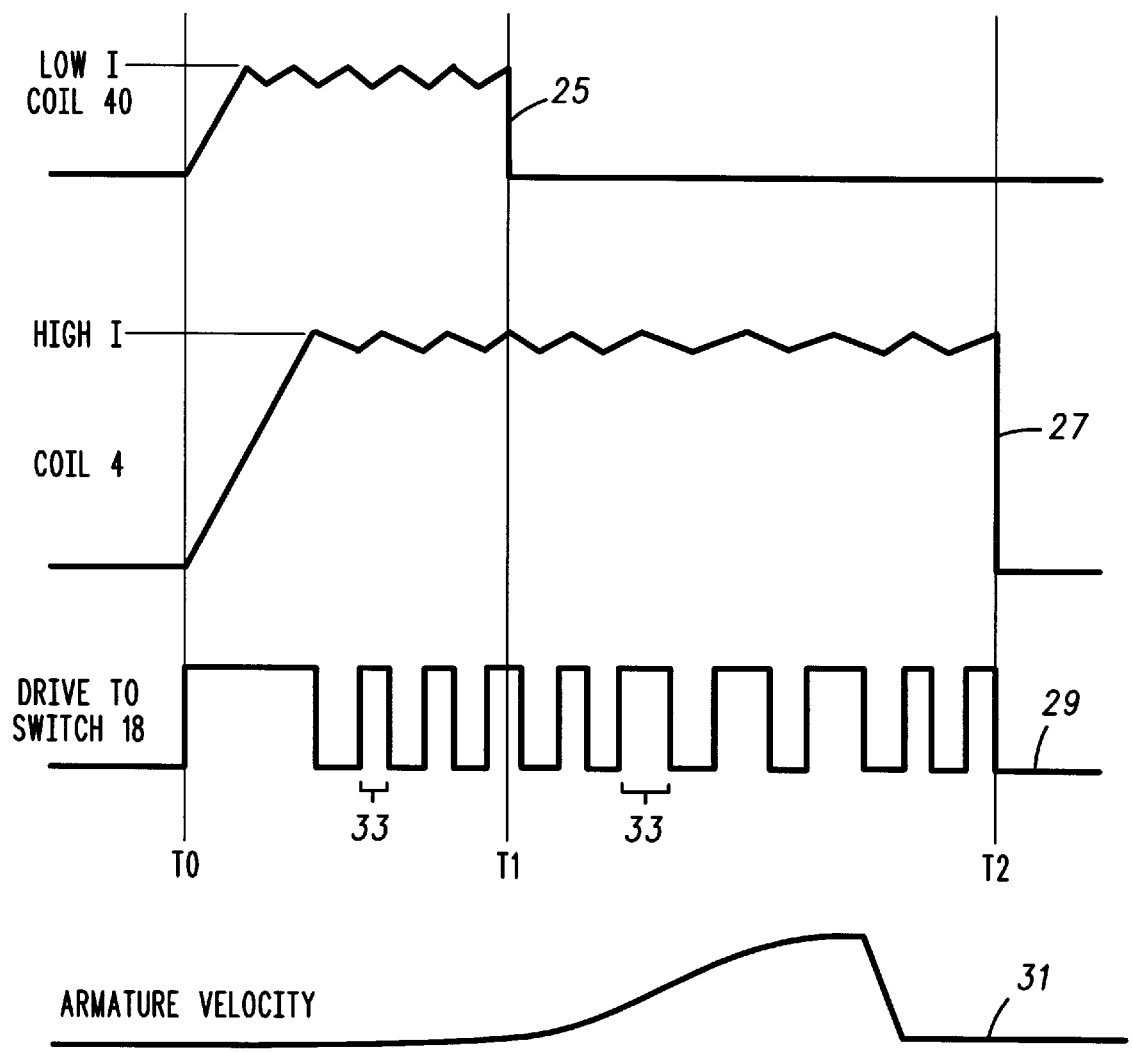
FIG. 4 shows waveforms which are useful in explaining the operation of the solenoid arrangement of FIG. 1.

Referring now also to FIG. 4 which shows waveforms which are useful in understanding the operation of the solenoid arrangement 2 when the solenoid armature is initially in a closed position with the second solenoid coil 40. Over time a holding current signal 25 is established in the second solenoid coil 40, a pulling current signal 27 is established in the first solenoid coil 4, a PWM control signal 29 is generated by the processor unit 6 and supplied to the second switch 18 of the first driver circuit 9. FIG. 4 also shows a representation of the velocity of the solenoid armature 5.

As can be seen from FIG. 4, whilst the solenoid armature 5 is stationary (between T0 and T1), the required ON time or rise time of the pulling current signal 27, which is also represented by the width 33 of the PWM pulses of the PWM control signal 29, remains at a fairly constant initial value. However, when the solenoid armature starts to move (at time T1) and the solenoid armature's velocity increases, a back ElectroMotive Force (EMF) is generated by the solenoid armature which results in the rise time required suddenly increasing. As the rise time increases, the width 33 of the PWM pulses increases. Thus, the width of the PWM pulses provides an indication of the velocity of the armature.

Depending on the battery voltage, this change in rise time can be easily a factor of two. The change in rise time due to the back EMF may last for only one PWM pulse or for several PWM pulses depending on the operating frequency of the PWM pulses and the velocity of the armature.

When the armature comes to a rest and the second solenoid coil 40 is in the closed position (at time T2), the rise time substantially returns to its value, as measured between time T0 and time T1, and hence the width of the PWM pulses returns to its initial value.

The present invention utilises the fact that the width of the PWM pulses, which is also representative of the rise time, provides an indication of the armature velocity and that therefore changes in armature velocity, for example the change when the armature first moves and the change when the armature comes to rest in the closed position, can be detected by monitoring the width of the PWM pulses. The accuracy in measuring the closure of the solenoid is defined by the PWM operating frequency.

Figure 5A:
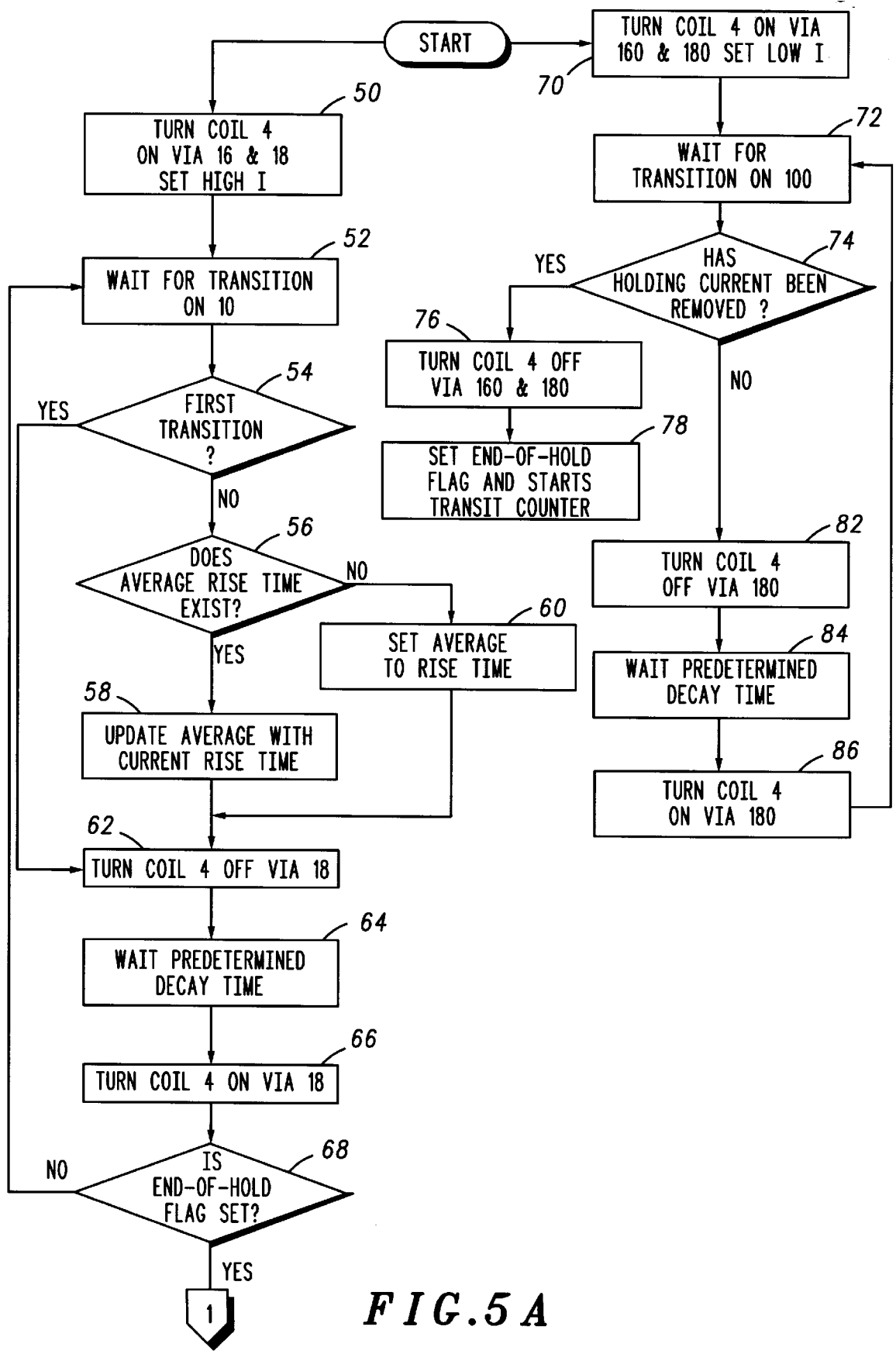
FIGS. 5A and 5B show a flow chart illustrating the method of closure detection in accordance with the present invention.
Figure 5B:
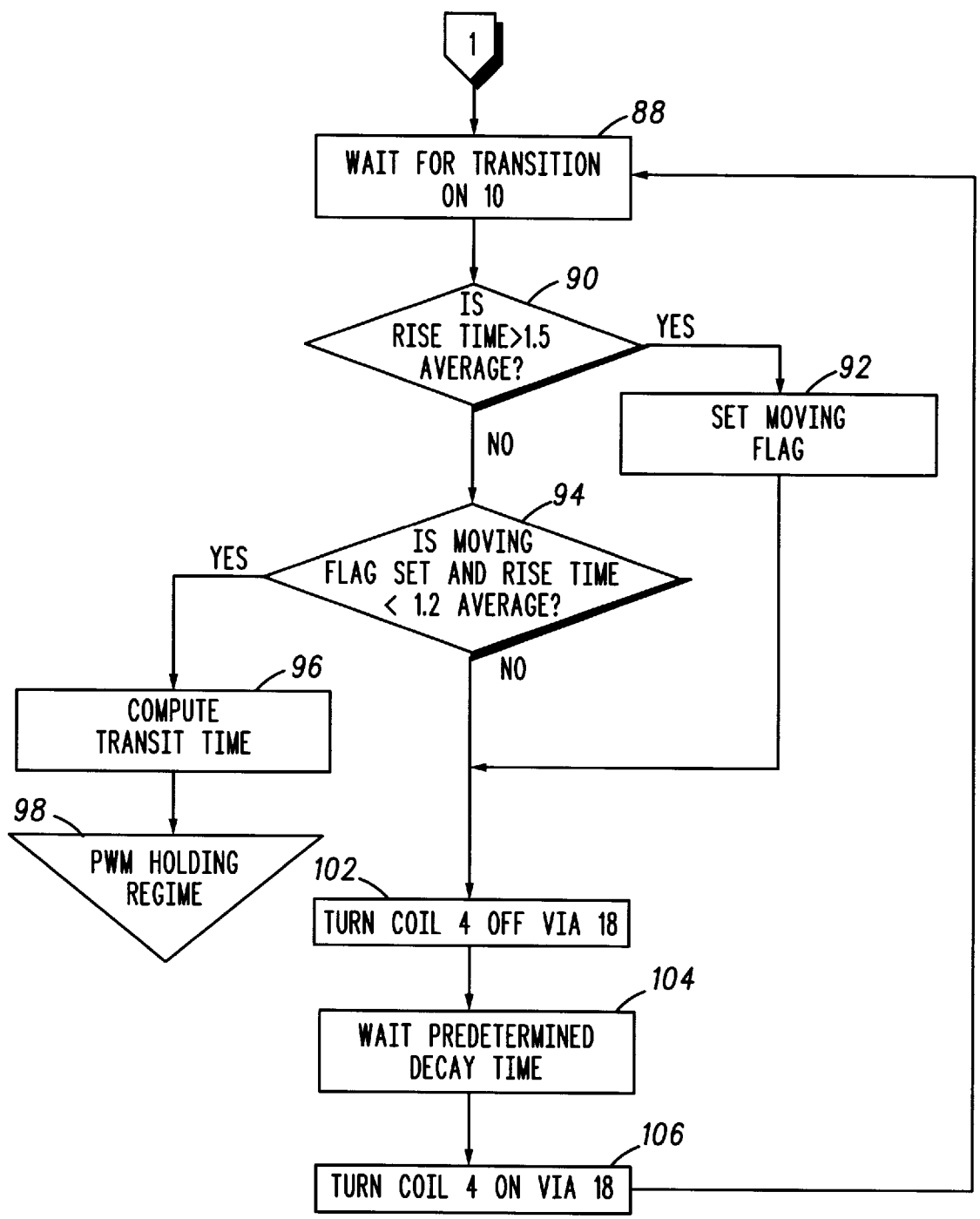

A method for detecting closure of a solenoid coil in accordance with the preferred embodiment of the present invention will now be described referring to FIGS. 1–4 and also to the flow chart shown in FIGS. 5A and 5B. In the description which follows it is assumed that the solenoid armature 5 is initially in the closed position at the second solenoid coil 40. If it is desired to also determine when the solenoid armature 5 moves from the first solenoid coil 4 to the closed position at the second solenoid coil 40, the following operation need only be reversed for the first 9 and second 11 driver circuits and first 4 and second 40 solenoid coils.

The method begins at step 50 for the first solenoid coil 4 and step 70 for the second solenoid coil 40. Step 50 and step 70 are performed concurrently. For clarity the actions resulting from step 70 are described first, however in reality the actions resulting from step 50 and step 70 will be occurring at the same time.

At step 70, the second solenoid coil 40 is turned on: the processor unit 6 closes first switch 160 via level shifter circuit 80, closes second switch 180 and sets third switch 200 so that the first reference current signal LowI is applied to comparator 100. When the current in the solenoid coil 40 reaches the level of the first reference current signal, LowI, a transition in the output signal at the output of the comparator 100 is generated.

When a transition is detected at step 72, the processor unit 6, at step 74, checks an internal store (not shown), to see if the holding current has been removed: that is, to see if the end of the holding current pulse has been reached. If the holding current has been removed, then the processor unit 6 goes to step 76, otherwise it goes to step 82. At step 82, the processor unit 6 opens second switch 180 to turn the second solenoid coil 40 off for the predetermined time, the decay time. The current in the second solenoid coil 40 decays through first switch 160 and the re-circulation diode 140.

After the predetermined decay time has expired at step 84, the processor unit 6 turns the second solenoid coil 40 back on via second switch 180, at step 86. The processor unit 6 then jumps back to step 72 where it waits for another transition on the output of the comparator 100 and the cycle repeats.

When the processor unit 6 reaches step 76 the holding current has been removed and the end of holding current pulse has been reached. The processor unit 6 turns off the second solenoid coil 40 via first switch 160 and second switch 180. As previously described, level shifter circuit 80 drives the first switch 160 into it's linear region causing the current in the second solenoid coil 40 to quickly decay to zero. Step 78 sets an end-of-hold flag (not shown) inside the processor unit 6 to indicate to step 68 the status of the holding current, and starts an internal counter (not shown) that will be used to calculate the transit time; that is, the time taken for the solenoid armature 5 to move from the second solenoid coil 40 to the first solenoid coil 4.

At step 50, the first solenoid coil 4 is turned on: the processor unit 6 closes first switch 16 via level shifter circuit 8, closes second switch 18 and sets third switch 20 so that the second reference current signal HighI is applied to comparator 10. When the current in the first solenoid coil 4 reaches the level of the second reference current signal, HighI, a transition in the output signal at the output of the comparator 10 is generated.

When a transition is detected at step 52, the processor unit 6, at step 54, checks an internal store (not shown) to see if this is the first transition at the output of the comparator 10. If it is the first transition, then the processor unit 6 goes to step 62, otherwise it goes to step 56.

At step 56, the processor unit 6 checks an internal store (not shown) to see if there is already stored an average rise time for the first solenoid coil 4. If an average rise time is stored, the processor unit 6 updates the average rise time to include the current rise time in the average, at step 58. If there is no average rise time stored, then the processor unit 6 sets the average rise time to the current rise time, step 60.

The processor unit 6 then proceeds to step 62, where it turns the first solenoid coil 4 off via second switch 18 for the predetermined decay time. At the end of the predetermined decay time, step 64, the processor unit 6 turns the first solenoid coil 4 on via second switch 18 at step 66.

At step 68 the processor unit 6 checks the end-of-hold flag to see if it is set. If the flag is set, the processor unit 6 jumps to step 88 and if not set, jumps to step 52 and the cycle repeats.

At step 88, the processor unit 6 waits for a transition on the output of the comparator 10. At step 90, the processor unit 6 checks to see if the current rise time has exceeded the stored average rise time by a predetermined amount, for example 50%. If it has exceeded the average by the predetermined amount, then the processor unit 6 goes to step 92 where it sets the armature moving flag (not shown) inside the processor unit 6 and goes to step 102. If it has not exceeded the average by the predetermined amount, then the processor unit 6 checks the armature moving flag and compares the current rise time to the stored average rise time. If the armature moving flag is set and the rise time is within a predetermined amount, for example 20%, of the stored average rise time, it is assumed that the solenoid armature has stopped and the processor unit proceeds to step 96. If either the armature moving flag is not set or the rise time is not within the predetermined amount of the stored average rise time, the processor unit 6 goes to step 102.

At step 102, the processor unit 6 then turns the first solenoid coil 4 off via second switch 18 for the predetermined decay time. At the end of the predetermined decay time, step 104, the processor unit 6 turns the first solenoid coil 4 on via second switch 18 at step 106. The processor unit 6 then jumps to step 88 to wait for another transition on the output of the comparator 10.

At step 96, the processor unit 6 calculates the transit time from step 78 to the armature stopping, at step 94. It does this by referring to an internal counter (not shown) and the last 3 rise times: that is, the rise time of the current peak during which the solenoid armature is determined to have stopped, the stopped current peak, the rise time of the current peak preceding the stopped current peak and the rise time of the current peak succeeding the current peak. These last 3 rise times will be referred to as RISE1, RISE2 and RISE3, respectively, with RISE3 being the most recent.

It is known that the armature must have stopped before RISE3 started, otherwise RISE3 would have failed the test in step 94. Likewise, the armature must have been moving at the start of RISE2, otherwise RISE2 would have passed the test in step 94. Therefore, by comparing and ratioing the lengths of RISE1, RISE2 and RISE3, it is possible to calculate when in RISE2 the armature stopped moving. The time from step 78 is then calculated by examining the internal counter, which was started at step 78, and counting back to the point in RISE2 when it is calculated that the armature stopped. The processor unit 6 then goes to step 98 which implements a PWM holding regime.

In the PWM holding regime, once closure has been detected, the processor unit 6 keeps opening and closing switch 8 so that current flows through the solenoid coil 4 in order to ensure that the solenoid armature is maintained in the closed position until it is desired to open the solenoid coil again. In order to reduce power dissipation whilst the solenoid coil is closed, the level of the reference current signal can be reduced.

In the preferred embodiments described herein, a constant 'OFF' time Pulse Width Measurement (PWM) arrangement has been used to control the current in the coil 4 and for closure detection. However, it will be appreciated that other PWM schemes, such as constant frequency, may also be used.

The two-coil solenoid arrangement described herein has particular advantages for the automotive fuel injector applications. In such applications, the armature forms the shuttle valve which moves back and forth between the two coils. The injection of the fuel into the engine is triggered by the movement of the shuttle. The benefit of such an arrangement is that it is zero displacement so the coils do not have to fight the fuel pressure which can be 100 MPa (Mega Pascals).

In fuel injectors, it is only necessary to determine the closure of the solenoid coil in one direction only. That is, it is not always necessary for the processor unit 6 to determine closure of both the first 4 and second 40 solenoid coils.

The closure detection method in accordance with the present invention may be implemented either in software or in silicon such as an ASIC. The present invention therefore provides a low cost means for detecting closure of a solenoid coil. Since in the preferred embodiment the closure of the solenoid coil is detected by monitoring the changes in the width of the PWM control pulses and the accuracy is defined by the PWM operating frequency, the present invention provides an accurate method for closure detection. This provides significant advantages for automotive diesel fuel injector applications where the timing of the solenoid closure and hence fuel injection is critical.

I claim:

1. A method for detecting closure of a solenoid coil in a solenoid arrangement comprising first and second solenoid coils and a solenoid armature that moves between the first and second solenoid coils, the method comprising the steps of:

providing a holding current signal to the first solenoid coil to maintain the solenoid armature in an initial closed position with the first solenoid coil;

providing a pulling current signal to the second solenoid coil, the pulling current signal comprising a plurality of current peaks, each of the current peaks having a measurable rise time;

storing a value representative of the rise time for one of the plurality of current peaks;

removing the holding current signal from the first solenoid coil;

sensing the rise time of each of the current peaks in the second solenoid coil and determining when the rise time of a current peak changes from the stored rise time by a predetermined amount which indicates that the solenoid armature has started to move towards the second solenoid coil;

continuing to sense the rise time of each of the current peaks in the second solenoid coil; and providing an indication that the solenoid armature is in a closed position with the second solenoid coil when the rise time of a current peak returns to substantially the same value as the stored rise time.

2. A method for detecting closure of a solenoid coil in accordance with claim 1 wherein the step of determining when the rise time of a current peak changes from the stored rise time by a predetermined amount comprises determining when the rise time of a current peak exceeds the stored rise time by 50%.

3. A method for detecting closure of a solenoid coil in accordance with claim 1 wherein the step of providing an indication that the solenoid armature is in a closed position comprises providing such an indication when the rise time of a current peak returns to within 20% of the stored rise time.

4. A method for detecting closure of a solenoid coil in accordance with claim 1 wherein each of the plurality of current peaks of the pulling current signal has a constant decay time.

5. A method for detecting closure of a solenoid coil in accordance with claim 1 wherein the holding current signal comprises a plurality of current peaks.

6. A method for detecting closure of a solenoid coil in accordance with claim 5 wherein each of the plurality of current peaks of the holding current signal has a constant decay time.

7. A method for detecting closure of a solenoid coil in accordance with claim 5 wherein the amplitude of the current peaks of the pulling current signal is greater than the amplitude of the current peaks of the holding current signal.

8. A method for detecting closure of a solenoid coil in accordance with claim 1 wherein the step of determining the rise time for one of the plurality of current peaks comprises sensing the rise time for a predetermined number of current peaks and determining the average rise time for the predetermined number of current peaks, the average rise time being stored as the stored rise time.

9. A method for detecting closure of a solenoid coil in accordance with claim 1 further comprising the step of calculating a transit time, the transit time being the time from when the solenoid armature starts to move to when it reaches the closed position, the calculating step comprising the steps of:

recording the start time when the holding current is removed;

determining the rise times of the current peak preceding and of the current peak succeeding the stopped current peak whose rise time is determined to have returned to substantially the same value as the stored rise time;

ratioing the determined rise times of the preceding, succeeding and stopped current peaks to determine a stop time, the stop time being the time when in the stopped current peak the solenoid armature reached the closed position; and using the determined stop time and recorded start time to calculate the transit time.

10. A method for detecting closure of a first solenoid coil in a solenoid arrangement comprising first and second solenoid coils and a solenoid armature that moves between the first and second solenoid coils, the solenoid arrangement further comprising a switch coupled in series with the second solenoid coil between a supply voltage terminal and a reference voltage terminal, the method comprising the steps of:

providing a holding current signal to the first solenoid coil to maintain the solenoid armature in an initial closed position with the first solenoid coil;

providing a PWM control signal to the switch to control the opening and closing of the switch such that a pulling current signal, comprising a plurality of current peaks, is established in the second solenoid coil, each of the current peaks having a measurable rise time which is dependent on the width of the corresponding pulse of the PWM control signal;

storing a value representative of the width of a PWM control signal pulse for one of the plurality of current peaks;

removing the holding current signal from the first solenoid coil;

sensing the width of the PWM control signal pulse for each of the current peaks in the second solenoid coil and determining when the sensed width changes from the stored width by a predetermined amount which indicates that the solenoid armature has started to move towards the second solenoid coil;

continuing to sense the width of the PWM control signal pulse for each of the current peaks in the second solenoid coil; and providing an indication that the solenoid armature is in a closed position with the second solenoid coil when the sensed width of a PWM control signal pulse returns to substantially the same value as the stored width.

11. A method for detecting closure of a solenoid coil in accordance with claim 10 wherein the step of determining when the sensed width changes from the stored width by a predetermined amount comprises determining when the sensed width exceeds the stored width by 50%.

12. A method for detecting closure of a solenoid coil in accordance with claim 10 wherein the step of providing an indication that the solenoid armature is in a closed position comprises providing such an indication when the sensed width returns to within 20% of the stored width.

13. A method for detecting closure of a solenoid coil in accordance with claim 10 wherein each of the plurality of current peaks of the pulling current signal has a constant decay time.

14. A method for detecting closure of a solenoid coil in accordance with claim 10 wherein the solenoid arrangement further comprises a switch coupled in series with the first solenoid coil between the supply voltage terminal and the reference voltage terminal, and wherein the providing a holding current signal step comprises the step of:

providing a PWM control signal to the switch in series with the first solenoid coil to control the opening and closing of the switch such that the holding current signal, comprising a plurality of current peaks, is established in the first solenoid coil, each of the current peaks having a measurable rise time which is dependent on the width of the corresponding pulse of the PWM control signal.

15. A method for detecting closure of a solenoid coil in accordance with claim 14 wherein the amplitude of the current peaks of the pulling current signal is greater than the amplitude of the current peaks of the holding current signal.

16. A method for detecting closure of a solenoid coil in accordance with claim 10 further comprising the step of calculating a transit time, the transit time being the time from when the solenoid armature starts to move to when it reaches the closed position, the calculating step comprising the steps of:

recording the start time when the holding current is removed;

determining the widths of the PWM control signal pulses for the current peak preceding and for the current peak succeeding the stopped current peak whose PWM control signal pulse width is determined to have returned to substantially the same value as the stored width;

ratioing the determined PWM control signal pulse widths of the preceding, succeeding and stopped current peaks to determine a stop time, the stop time being the time when in the stopped current peak the solenoid armature reached the closed position; and using the determined stop time and recorded start time to calculate the transit time.

* * * * *